US009287907B2

(12) United States Patent
Locher

(10) Patent No.: US 9,287,907 B2
(45) Date of Patent: Mar. 15, 2016

(54) MANAGEMENT OF COEXISTENCE OF COMMUNICATING SUB-SYSTEMS IN WIRELESS DEVICES

(71) Applicant: ST-Ericsson SA, Plan-les-Ouates (CH)

(72) Inventor: Matthias Locher, Munchenstein (CH)

(73) Assignee: ST-ERICSSON SA, Plan-les-Ouates (CH)

(*) Notice: Subject to any disclaimer, the term of this patent is extended or adjusted under 35 U.S.C. 154(b) by 0 days.

(21) Appl. No.: 14/388,975

(22) PCT Filed: Mar. 25, 2013

(86) PCT No.: PCT/EP2013/056304
§ 371 (c)(1),
(2) Date: Sep. 29, 2014

(87) PCT Pub. No.: WO2013/149878
PCT Pub. Date: Oct. 10, 2013

(65) Prior Publication Data
US 2015/0056930 A1 Feb. 26, 2015

Related U.S. Application Data

(60) Provisional application No. 61/637,534, filed on Apr. 24, 2012.

(30) Foreign Application Priority Data

Apr. 5, 2012 (EP) ..................................... 12305406

(51) Int. Cl.
H04B 1/10 (2006.01)
H04B 17/14 (2015.01)
(Continued)

(52) U.S. Cl.
CPC ............ *H04B 1/0475* (2013.01); *H04B 1/0064* (2013.01); *H04B 1/38* (2013.01);
(Continued)

(58) Field of Classification Search
CPC .... H04B 1/0475; H04B 1/0064; H04B 1/525; H04B 1/10; H04B 2001/1045; H04B 17/14; H04W 24/08
See application file for complete search history.

(56) References Cited

U.S. PATENT DOCUMENTS 6,819,936 B2 * 11/2004 Weissman ............. H04W 52/52
455/522
2007/0202826 A1 * 8/2007 Dean ................... H04B 7/15535
455/230

(Continued)

OTHER PUBLICATIONS

International Search Report issued in corresponding International application No. PCT/EP2013/056304, date of mailing May 21, 2013.
Extended European Search Report issued in corresponding European application No. EP 12 30 5406, date of completion Sep. 11, 2012.

*Primary Examiner* — Andrew Wendell
(74) *Attorney, Agent, or Firm* — Patent Portfolio Builders PLLC

(57) ABSTRACT

A method of calibrating coexistence of several wirelessly communicating sub-systems within a wireless device wherein the wirelessly communicating sub-systems comprise several transmitters and several receivers which are interconnected through one or more interfaces, the method comprising:—activating one of the transmitters while maintaining the other transmitters off by causing said transmitter to transmit a first signal with a known set of characteristics;—measuring unwanted signal received at each receiver and originating from a coupling of said receivers with the activated transmitter;—storing coupling data derived from each of the measured unwanted signals in relation with the set of signal characteristics of the first signal and/or a set of unwanted signal characteristics, whereby forming a calibration database for adjusting operation of one or more transmitters and/or receivers to manage the coexistence of the plurality of wirelessly communicating sub-systems during normal operation of the wireless device.

13 Claims, 7 Drawing Sheets

(51) Int. Cl.
*H04B 1/525* (2015.01)
*H04B 1/04* (2006.01)
*H04B 1/00* (2006.01)
*H04B 1/3805* (2015.01)
*H04B 1/38* (2015.01)
*H04B 17/00* (2015.01)

(52) U.S. Cl.
CPC ............ *H04B 1/3805* (2013.01); *H04B 1/525* (2013.01); *H04B 17/002* (2013.01); *H04B 17/005* (2013.01); *H04B 17/0057* (2013.01)

(56) References Cited

U.S. PATENT DOCUMENTS

| | | | |
|---|---|---|---|
| 2011/0142100 A1* | 6/2011 | Farmer | G01S 5/0215 375/148 |
| 2011/0149920 A1 | 6/2011 | Liu et al. | |
| 2013/0051261 A1* | 2/2013 | Kazmi | H04B 7/0693 370/252 |
| 2014/0002131 A1* | 1/2014 | Shaeffer | G11C 5/063 326/30 |

\* cited by examiner

MANAGEMENT OF COEXISTENCE OF COMMUNICATING SUB-SYSTEMS IN WIRELESS DEVICES

TECHNICAL FIELD

The proposed solution relates to the management of the coexistence communicating sub-systems in wireless devices and, more particularly, to a method of calibrating such a device.

BACKGROUND

There has been an explosion of new wireless technologies over the recent years such as, for instance, WiFi, Bluetooth, ZigBee, UWB, Wireless HDMI, GPS and 2G/3G/4G cellular systems. Most of these technologies have become so ubiquitous in wireless devices that availability of combined RF transmitters and receivers of different technologies within a single wireless device has become very ordinary. A challenging aspect of the further development of wireless devices is to enable these technologies to coexist in a single wireless device while being at the same time able to mitigate the interference originating from the plurality of sub-systems.

The usual practice is to measure interferences between the sub-systems with respective technologies, by using external equipment at the end of the device manufacturing process. In fact, at the RF circuit level the effects of coupling between sub-systems have to be taken into account since each sub-system is specified to tolerate some level of noise. When that level of noise is exceeded, degradation of the receiver sensitivity is experienced by the wireless device. In addition, effects of this degradation are noticeable by the end user as audible noise, throughput decrease or connection drops. This is why actions may be taken further to the measurement of interferences to attenuate the impact of coupling over the coexistence performance. Such measures, called coexistence measures, may include operations such as power decrease of a disturbing transmitter power level, data drop of on a receiver or temporary deactivation of a receiver.

Disadvantageously, the process of measurement of interferences using external equipment can be very much time consuming. In fact, this process needs to be performed for every type of wireless device assembled by the wireless device integrator. A wireless device integrator usually manages numerous product lines such that specific coexistence measures might need to be implemented for each type of wireless device. Performing such time consuming measurement operations using external equipment followed by the design of coexistence measures to mitigate noise coupling mechanisms may prove unrealistic, and sometimes they are not even performed at all.

Additionally, coexistence measures are highly dependent on the type of wireless device being measured. Indeed, the layout and components of each type of wireless device, such as filters or antennas, might be different depending on the supported communication technologies, the supported frequency bands and/or the type of antennas that are used. Therefore, the interference paths between sub-systems of respective technologies might also be different for each type of sub-system.

SUMMARY

It is proposed to circumvent the use of external equipment to measure coupling values and do away with the time consuming process of design of coexistence measures, and to substitute thereto a simple measurement and calibration mechanism for managing the coexistence of a plurality of sub-systems implementing respective technologies in the wireless device.

Indeed, a first aspect proposes a method of calibrating coexistence of a plurality of wirelessly communicating sub-systems within a wireless device wherein the plurality of wirelessly communicating sub-systems comprises a plurality of transmitters and a plurality of receivers which are interconnected through one or more interfaces. The method comprises the step of activating a single one of the transmitters while maintaining the other transmitters off by causing said transmitter to transmit a first signal with a known set of characteristics; measuring unwanted signal received at each of the plurality of receivers and originating from a coupling of said receivers with the activated transmitter. The method further comprises the step of storing coupling data derived from each of the measured unwanted signals in relation with the set of signal characteristics of the first signal and/or a set of unwanted signal characteristics, whereby forming a calibration database usable for adjusting operation of one or more of the plurality of transmitters and/or receivers to manage the coexistence of the plurality of wirelessly communicating sub-systems during normal operation of the wireless device.

A second aspect proposes an apparatus for calibrating coexistence of a plurality of wirelessly communicating sub-systems within a wireless device wherein the plurality of wirelessly communicating sub-systems comprises a plurality of transmitters and a plurality of receivers which are interconnected through one or more interfaces. The apparatus comprises a unit configured for activating a single one of the transmitters while maintaining the other transmitters off by causing said transmitter to transmit a first signal with a known set of characteristics; a unit configured for measuring unwanted signal received at each of the plurality of receivers and originating from a coupling of said receivers with the activated transmitter. The apparatus further comprises a unit configured for storing coupling data derived from each of the measured unwanted signals in relation with the set of signal characteristics of the first signal and/or a set of unwanted signal characteristics, whereby forming a calibration database usable by a unit configured for adjusting operation of one or more of the plurality of transmitters and/or receivers to manage the coexistence of the plurality of wirelessly communicating sub-systems during normal operation of the wireless device.

Thus in a wireless device embodying the principles of the proposed method and apparatus, the maximisation of the coexistence of a plurality of communication technologies is done by creating and using a database containing coupling paths available in the wireless device.

In particular embodiments, the activating, measuring and storing are repeated for each of the plurality of transmitters.

In accordance with the proposed solution, the plurality of sub-systems operates respective communication technology.

For instance, the measuring of unwanted signal comprises measuring received signal strength indication (RSSI).

If desired, for each of the plurality of receivers, the coupling data is equal to the difference between the unwanted signal and a noise floor for said receiver defined as the level of noise received when none of the plurality of transmitters is activated.

In accordance with the proposed solution, the set of signal characteristics comprises at least one of signal power level, signal frequency and signal modulation scheme.

If desired, the adjusting operation of one or more of the plurality of transmitters and/or of the plurality of receivers comprises performing at least one of: adjusting signal power level, signal frequency and/or signal modulation scheme of the transmitters; causing the receiver to drop the received data; and/or, causing the receiver to be deactivated.

BRIEF DESCRIPTION OF THE DRAWINGS

A more complete understanding of the proposed solution may be obtained from a consideration of the following description in conjunction with the drawings, in which.

DETAILED DESCRIPTION

First, it is to be noted that the proposed solution is not limited to WiFi, Bluetooth, ZigBee, UWB, Wireless HDMI, GPS and 2G/3G/4G cellular systems.

Figure 1:
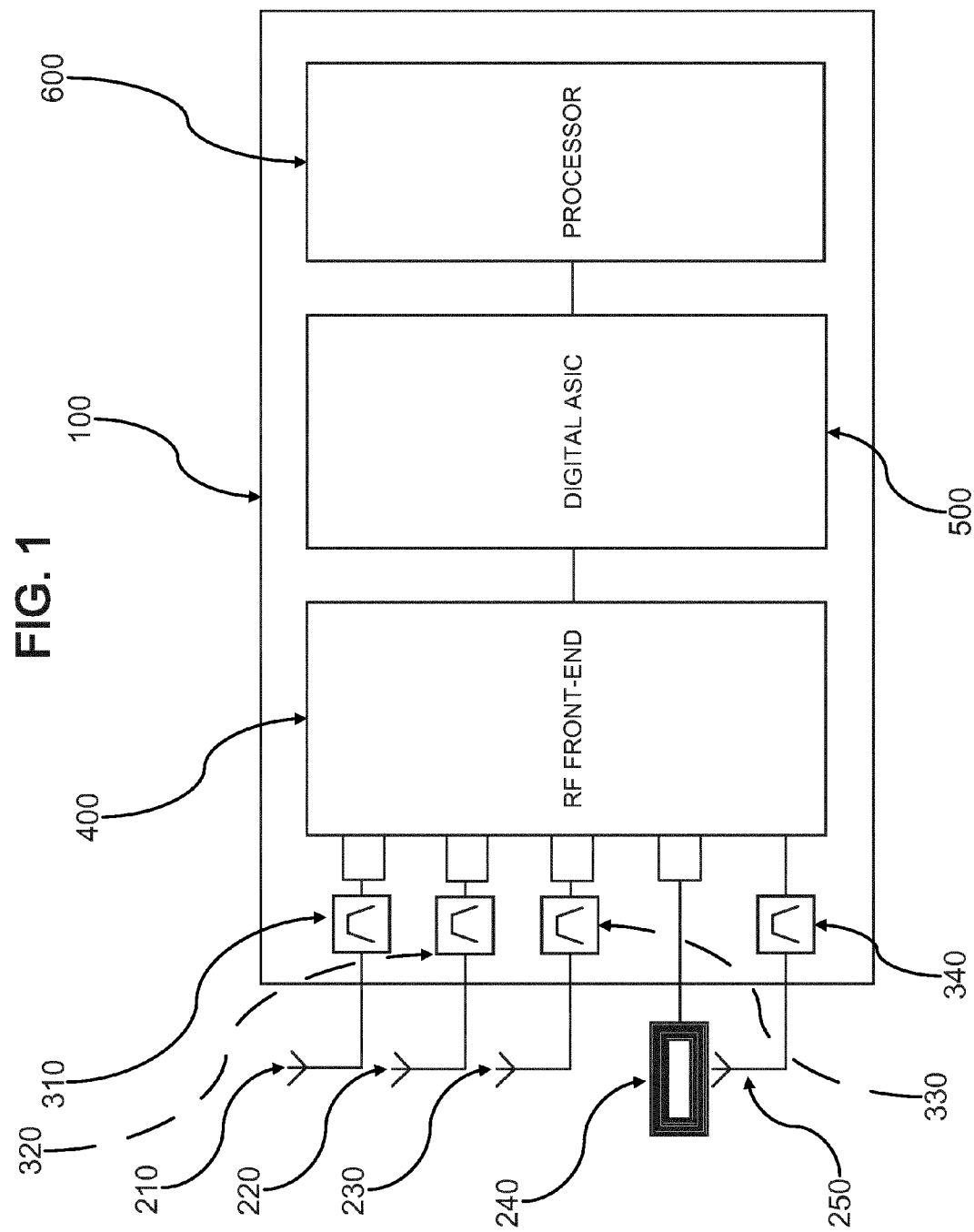
FIG. 1 is a block diagram illustrating an example of implementation of a wireless device

FIG. 1 is a block diagram illustrating an example of implementation of a wireless device. Referring to FIG. 1, there is shown therein the wireless device 100 comprising a processor 600, a digital Application Specific Integrated Circuit (ASIC) 500, a RF front-end 400, a plurality of filters 310, 320, 330, 340, a plurality of antennas 210, 220, 230, 250 and a magnetic tag 240 such as a Near Field Communications (NFC) tag. As shown by way of example in FIG. 1, the processor 600 may be connected to the digital ASIC 500. The digital ASIC 500 may be further connected to the RF front-end 400. The RF front-end 400 is connected the plurality of antennas 210, 220, 230, 250, for instance via the plurality of filters 310, 320, 330, 340, respectively. The RF front-end 400 is also connected to the magnetic tag 240.

The processor 600 is configured to take care of all applications run in the digital ASIC 500, and therefore acts as a central management unit.

Figure 4:
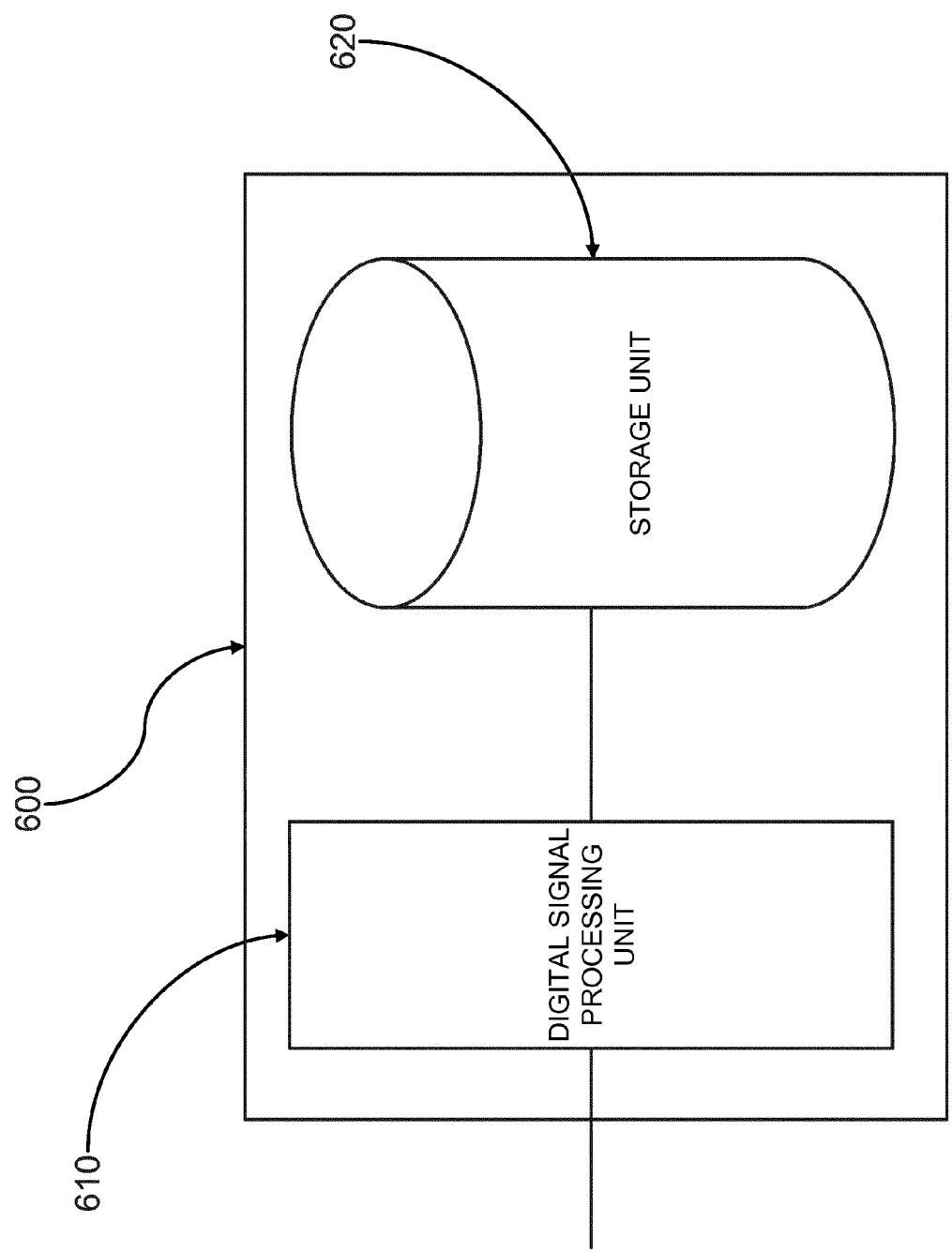
FIG. 4 is a block diagram illustrating an example of implementation of a processor of the wireless device.

With reference to FIG. 4, the processor 600 may comprise a Digital Signal Processing (DSP) unit 610 and a storage unit 620. The DSP unit 610 is responsible for handling communication to the digital ASIC 500. The storage unit 620 is adapted for storing data that might be used by the DSP unit 610 to manage the communications to the digital ASIC 500.

The digital ASIC 500 is configured to take care of all characteristics of signals managed at level of the RF front-end 400.

Figure 2:
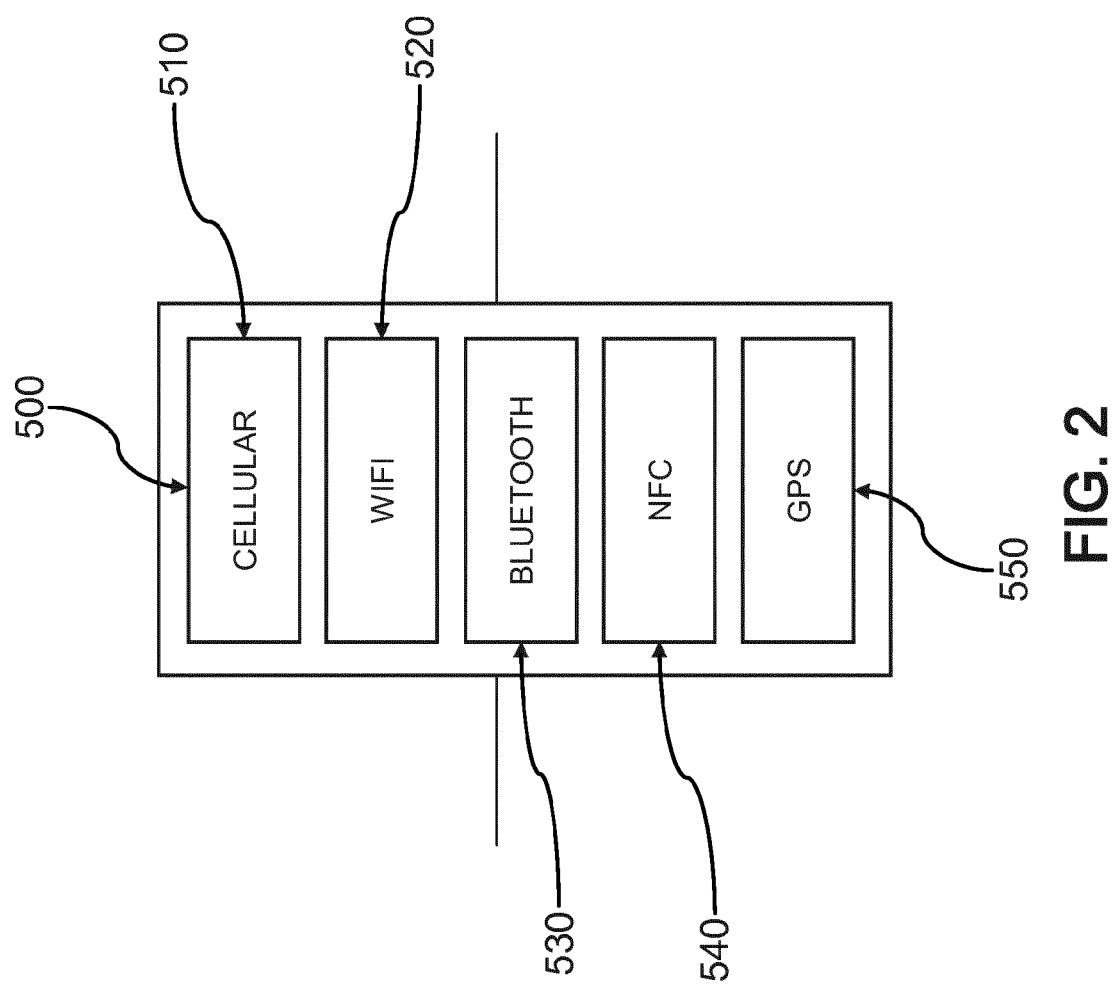
FIG. 2 is a block diagram illustrating an example of implementation of a digital ASIC of the wireless device.

Referring back to FIG. 2, the digital ASIC 500 may comprise a cellular modem 510, a WIFI modem 520, a Bluetooth modem 530, a NFC modem 540 and a Global Positioning System (GPS) modem 550, all being associated with respective applications and communicating sub-systems of the device. In all of the foregoing modems, main responsibilities are related to modulation and demodulation of signals managed at level of the RF front-end 400. There is at least one modem per communication technology supported by the device. It shall be noted, however, that a single modem could support several communication technologies. This could be the case for communication technologies that are rather alike in terms of physical transmission characteristics, and that operate in same or close frequency bands, such as WIFI and Bluetooth technologies which both work at 2.5 GHz. Hence, characteristics such as amplitude, phase, and frequency of signals managed at the RF front-end 400 level can be manipulated by the digital ASIC 500.

The RF front-end 400 is adapted to take care of transmission and/or reception of signals transmitted and/or received, respectively, at antennas 210, 220, 230, 250 and at the magnetic tag 240.

Referring back to FIG. 3, the RF front-end 400 may thus further comprise a cellular transmitter 401, a cellular receiver 403, a WIFI transmitter 411, a WIFI receiver 412, a Bluetooth transmitter 421, a Bluetooth receiver 422, a magnetic tag transmitter 431 such as a NFC transmitter, a magnetic tag receiver such as a NFC receiver 432 and/or a GPS receiver 441. These transmitters and receivers are part of corresponding communicating sub-systems, each of which being associated with a respective communication technology. In all of the foregoing transmitters, the main responsibility is to transmit or radiate a signal over the air. In all of the foregoing receivers, main responsibility is to receive signals transmitted or radiated over the air.

There is at least one transmitter and/or at least one receiver per communication technology supported by the device, but a single transmitter or receiver could be used to handle several communication technologies. This could be the case for communication technologies that are quite alike in terms of physical transmission characteristics and that are working in same or close frequency bands such WIFI and Bluetooth technologies which both work at 2.5 GHz as already mentioned above. Signals that are transmitted or received at the RF front-end 400 may further be filtered by filters 310, 320, 330 and 340. The filters 310, 320, 330 and 340 may be Bandpass filters that pass frequencies within the range of frequency of the corresponding communication technology and reject frequencies outside that range. These filters help reducing part of the coupling received from sub-systems associated with communication technologies different from the one of the sub-system considered.

It is desirable to measure the level of interferences received in each sub-system from sub-systems of the wireless device which implement other communication technologies. This may be necessary since each communication is specified to tolerate some level of noise. When that level of noise is exceeded, degradation of receiver sensitivity is experienced and effects of this degradation are observable by the end user as audible noise, throughput decrease or connection drops. After the measurements have been performed, it is possible to implement coexistence measures between the different communication technologies to attenuate the impact of coupling over the coexistence performance. Coexistence measures may comprise power decrease of a transmitter of a particular communication technology, data drop of on a receiver of a particular communication technology or temporary deactivation of a receiver of a particular communication technology.

In accordance with the proposed solution, it is proposed to circumvent the use of external equipment to measure coupling values and do away with the time consuming process of design of coexistence measures, by using a simple mechanism of measurement and calibration of coexistence implemented for instance at the processor level 600. Namely and as it will now be described with reference to FIG. 4, this mechanism may be implemented using the digital signal processing unit 610 and the storage unit 620.

The proposed solution may be regarded as a mechanism to be implemented into two phases. The first phase aims at determining the coupling paths without the use of external equipment connected to the wireless device 100. Moreover, the second phase aims at specifying how the gathered coupling measurements may be used to run coexistence measures dynamically instead of hard coding them into the wireless device 100.

In the first phase, all modems 510, 520, 530, 540 are individually activated in transmission one after the other, by the digital signal processing unit 610. This means that at least modulation and demodulation operations may be performed for each communication technology separately if signals are to be transmitted or received at the RF front-end 400.

Figure 3:
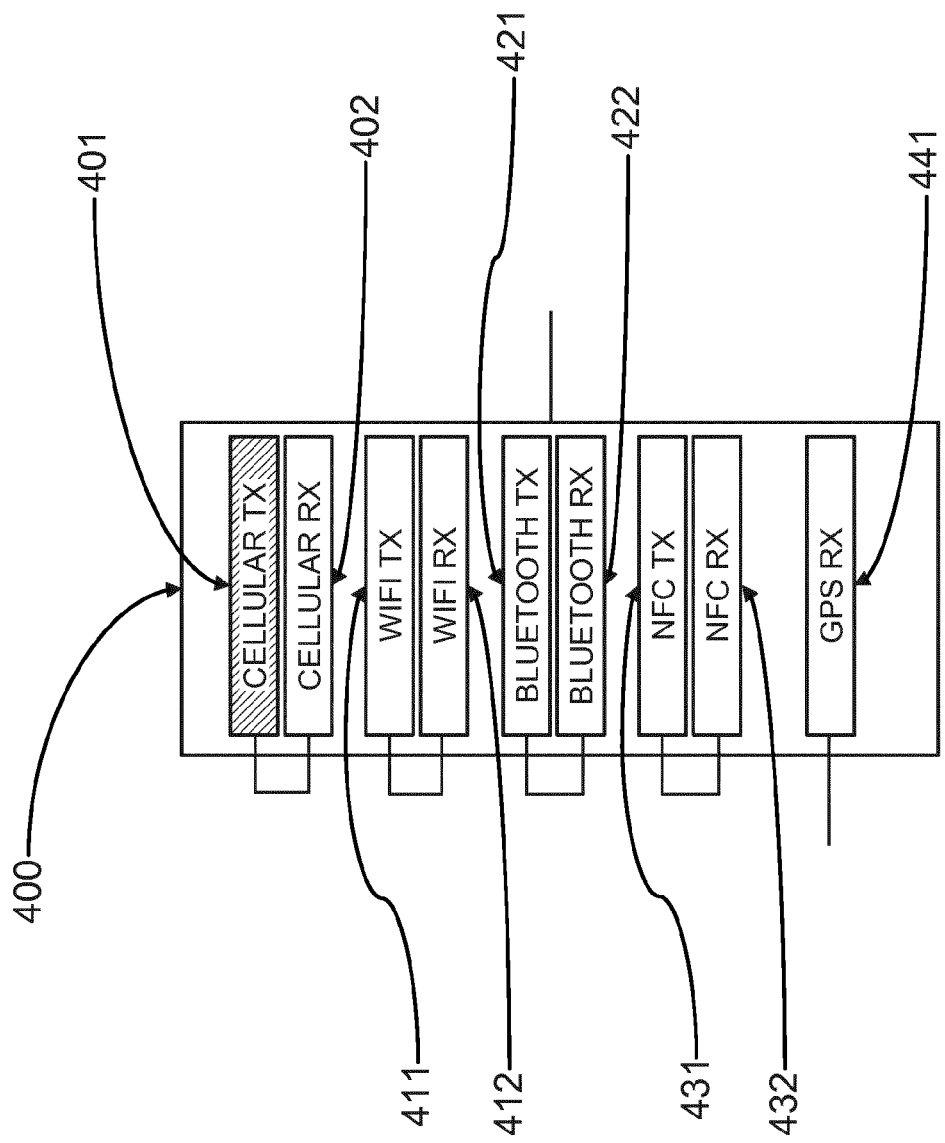
FIG. 3 is a block diagram illustrating an example of implementation of a RF front-end of the wireless device.

Referring to FIG. 3, only the cellular transmitter 401 is activated first, while all other transmitters 411,421,431 in the wireless device 100 are deactivated. All the receivers 402, 412, 422, 432 and 441 are activated and capable of receiving signals transmitted or radiated over the air on the particular frequency associated with the communication technology of the transmitter 401 being activated. Thus, the digital signal processing unit 610 may trigger a command to the cellular modem 510 to transmit a first signal using the cellular transmitter 401, a filter 310 and an antenna 210. The first signal may be a modulated signal or may be a pure signal conveying no data. The first signal may be received by the antennas 210, 220, 230 and 250 and at the magnetic tag 240. Thus, the first signal may be filtered by a filter 310, 320, 330, 340 prior to be sent to the corresponding RF front-end receivers 402, 412, 422, 132 and 441 and to be eventually demodulated by the modem 510, 520, 530, 540, 550, respectively.

Signals available at the modem 520, 530, 540 and 550 are considered as being unwanted signals. In fact, the communication technology used for transmitting the first signal using the cellular modem 510 is different from the communication technologies used by the other modems 520, 530, 540 and 550. Therefore, those signals that have been received by the other modems 520, 530, 540 and 550 are considered as being undesired and thus correspond to interferences. Unwanted received signals at modem 520, 530, 540 and 550 are measured against a signal indicator. For instance, the measured unwanted signal indicator may be the received signal strength indication (RSSI) measurements. This measurement may be used to calculate a coupling data, for instance expressed in dB, equal to the difference between RSSI and the noise floor present in a receiver when no signal is being received at the receiver.

In one embodiment, the noise floor present in a receiver when no signal at all is transmitted can be calculated using the proposed solution. In fact, the foregoing process applies totally and may differ by just deactivating all transmitters 401, 411, 421 and 431 while performing the measurement. Thus, the noise floor present in a receiver when no signal is being received at the receiver from any of the transmitters may also be a RSSI measurement. The difference between these two RSSI measurements (i.e. the one when only one transmitter is activated and the one when no transmitter is activated in the wireless device) is an indication of the increase of noise in the corresponding communication technology due to transmission on another particular communication technology. Corresponding coupling data, reflecting such indication, may be stored into the storage unit 620 together with a set of first signal and/or measured unwanted signal characteristics such as signal power, signal frequency and/or signal modulation.

The coupling from one communication technology to another communication technology may differ depending on signal characteristics such as signal power, signal frequency and/or signal modulation. This is why these characteristics may be stored alongside with the coupling data and may be helpful to clarify the impact of each of them in the coupling data. The operations of measurement and storage may be also performed for all possible configurations of signal power, signal frequency and/or signal modulation of the first signal transmitted from the cellular transmitter also for all possible configurations signal frequency of the receivers 402, 412, 422, 132 and 441. This may help creating a matrix containing all or most of configurations that wireless device 100 might operate.

Figure 5:
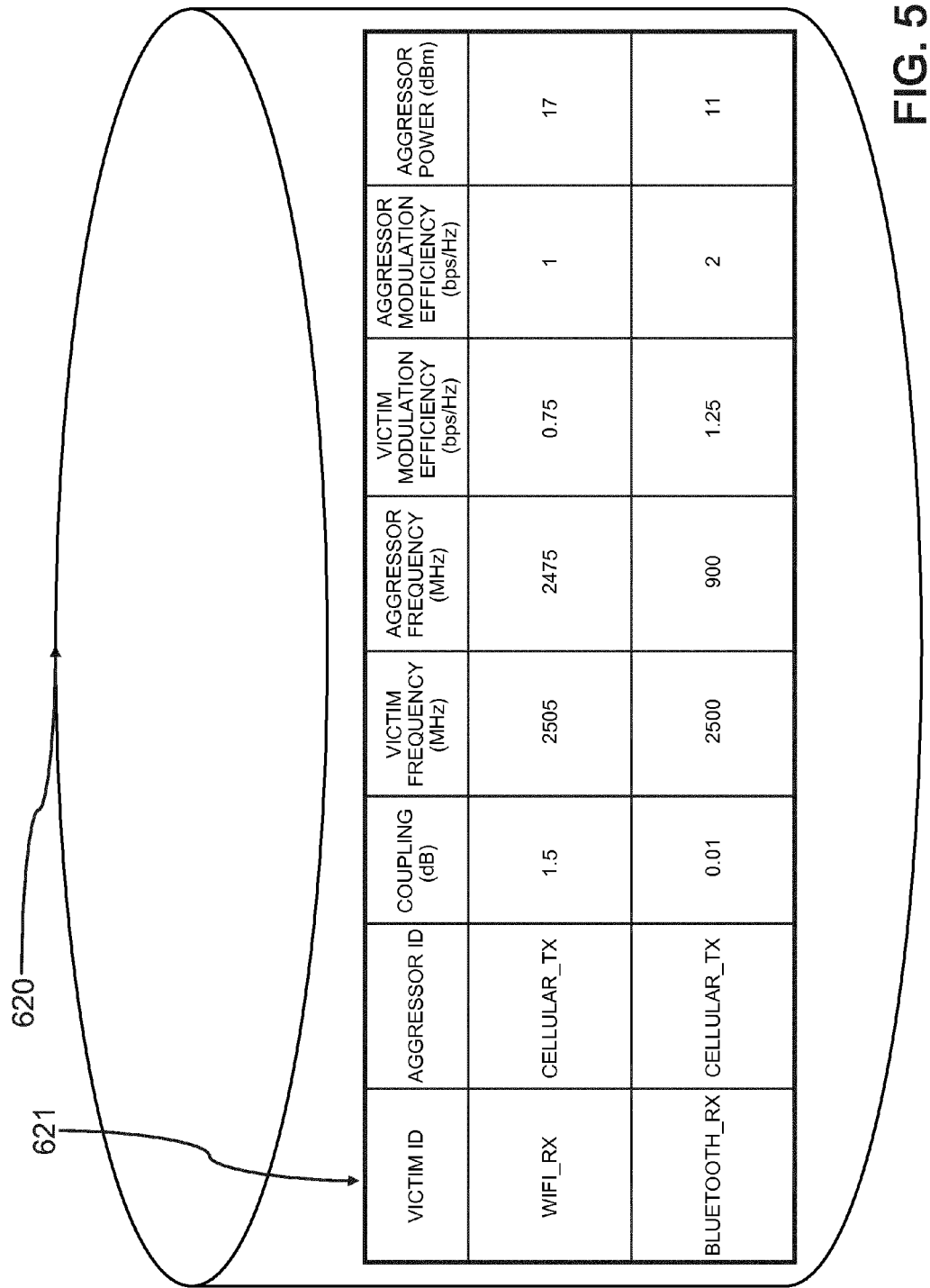
FIG. 5 is a block diagram illustrating an example of implementation of a storage unit of the wireless device

Referring to FIG. 5, there is shown therein the storage unit 620 and an exemplary table 621. The table 621 comprises eight columns named: VICTIM ID, AGGRESSOR ID, COUPLING (dB), VICTIM FREQUENCY (MHz), AGGRESSOR FREQUENCY (MHz), VICTIM MODULATION EFFICIENCY (bps/Hz), AGGRESSOR MODULATION EFFICIENCY (bps/Hz), and AGGRESSOR POWER (dBm). "VICTIM" needs to be understood as a communication technology suffering from the interference of another communication technology referenced herewith as "AGRESSOR". "VICTIM ID" is the identification of the victim. All lines of table 621 containing the same "VICTIM ID" correspond to coupling paths to that victim on the wireless device 100. "AGRESSOR ID" is the identification of the aggressor. "COUPLING (dB)" is the amount of coupling perceived at the victim level due to aggressor transmission identified by "AGRESSOR ID". This value is expressed in dB but could also be expressed in another unit as long as it is meant to express a sense of degradation of performance of the victim due o transmission from the aggressor. "VICTIM FREQUENCY (MHz)" is the frequency used to receive signals on the victim. "AGGRESSOR FREQUENCY (MHz)" is the frequency used to transmit signals on the aggressor indicating the state or configuration of the transmit chain used. "VICTIM MODULATION EFFICIENCY (bps/Hz)" is a representation of the modulation used by the victim. The number of bits contained in a received symbol is represented by this number, alternatively any value indicating the state or configuration of the received chain used for the measurement. "AGGRESSOR MODULATION EFFICIENCY (bps/Hz)" is a representation of the modulation used by the aggressor. The number of bits contained in a transmitted symbol is represented by this number. "AGGRESSOR POWER (dBm)" is the transmission power used by the aggressor to transmit the first signal. The table 621 may be filled at the end of the production line if possible.

Another possibility is the use of the proposed solution to perform self-test on the wireless device to verify if for instance antennas are properly mounted of assembled without external equipment. In fact self-tests are often performed with an external equipment. The use of proposed solution can obviate this common practice. The table 621 may also be filled while the wireless device is in operation. Namely, during empty or idle time slots, depending on the communication technology. This ways the table 621 could be updated or kept up to date while being used on a live network.

In a second phase, the information stored in the storage unit 620 may be used to dynamically launch coexistence measures in the wireless device 100. If desired, particular embodiments may optionally execute dynamic coexistence measures by choosing at least one operation among the following: adjusting signal power level, signal frequency and/or signal modulation scheme of the transmitters; causing the receiver to drop the received data; and/or, causing the receiver to be deactivated.

For instance referring to the foregoing first aspect, prior to transmission, a modem 510 may inform the processor 600 about a future transmission attempt. Signal characteristics of first signal to be transmitted by that modem 510 such as signal power, signal frequency and/or signal modulation would be sent to the processor 600. The processor 600 then reads the table 621 present in the storage unit 620 to anticipate any potential severe coupling paths if the transmission is emitted. The level of coupling allowed on a particular communication technology may be defined by the wireless device integrator or by a national, regional or international regulatory body. If severe coupling path is found in table 621 the processor 600 launches dynamic coexistence measures. For instance, transmitted signal could be attenuated if possible. A victim with low priority data can also drop its data. Alternatively, a transceiver can be deactivated prior to transmission of the aggressor and reactivated afterwards. Also, table 621 may be used to determine whether special measures should be considered to increase the linearity of the victim in order, for instance, to optimize its power consumption. Alternatively, based on table 621, the aggressor may also be tuned. For instance, its control bits could be changed in such a way that noise level would be brought below a tolerable limit. This control bits could possibly contain current and number of bits used in the RF power amplifier or pre-drivers thus resulting in optimised power consumption. In this phase of the proposed solution, coexistence measures are dynamically executed using the information stored in the storage unit 620 and signal characteristics of first signal to be transmitted by that modem 510 such as signal power, signal frequency and/or signal modulation.

Figure 6:
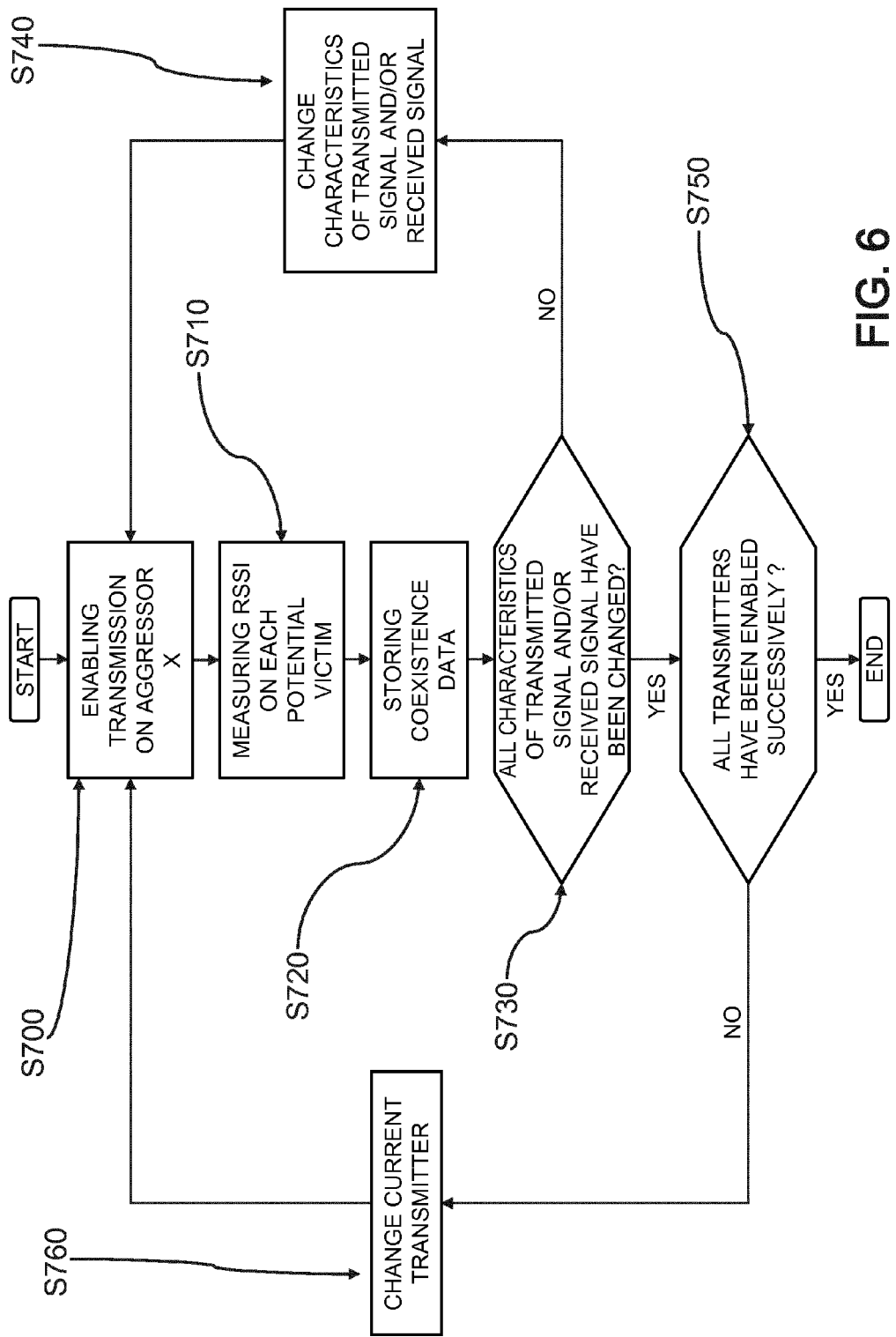
FIGS. 6 and 7 are flow diagrams illustrating embodiments of the proposed method.

FIG. 6 is a flow diagram illustrating embodiments of the proposed method. Depending on the embodiment, additional steps may be added, others removed, and the ordering of the steps rearranged. Referring to FIG. 6, in step S700, transmission is enabled on a single aggressor x while all other transmitters are deactivated. In step S710, a RSSI measurement is performed on each potential victim. A coupling data derived from this measurement is stored alongside with characteristics of transmitted and received signals, in step S720, as coexistence data, as it was described in the foregoing with reference to the first phase of the proposed solution. In step S730, a control is made to check whether characteristics of transmitted signal and/or received signal have been changed. This helps covering all possible aspects of coupling. If this is not the case, a modification at a time is performed on the transmitted signal and/or the received signal in step S740. If this is the case, on the contrary, then in step S750 a control is made to check whether all transmitters have been enabled successively. If this is not the case, a change of current transmitter is made in step S760. If this is the case, on the contrary, the algorithm stops.

Figure 7:
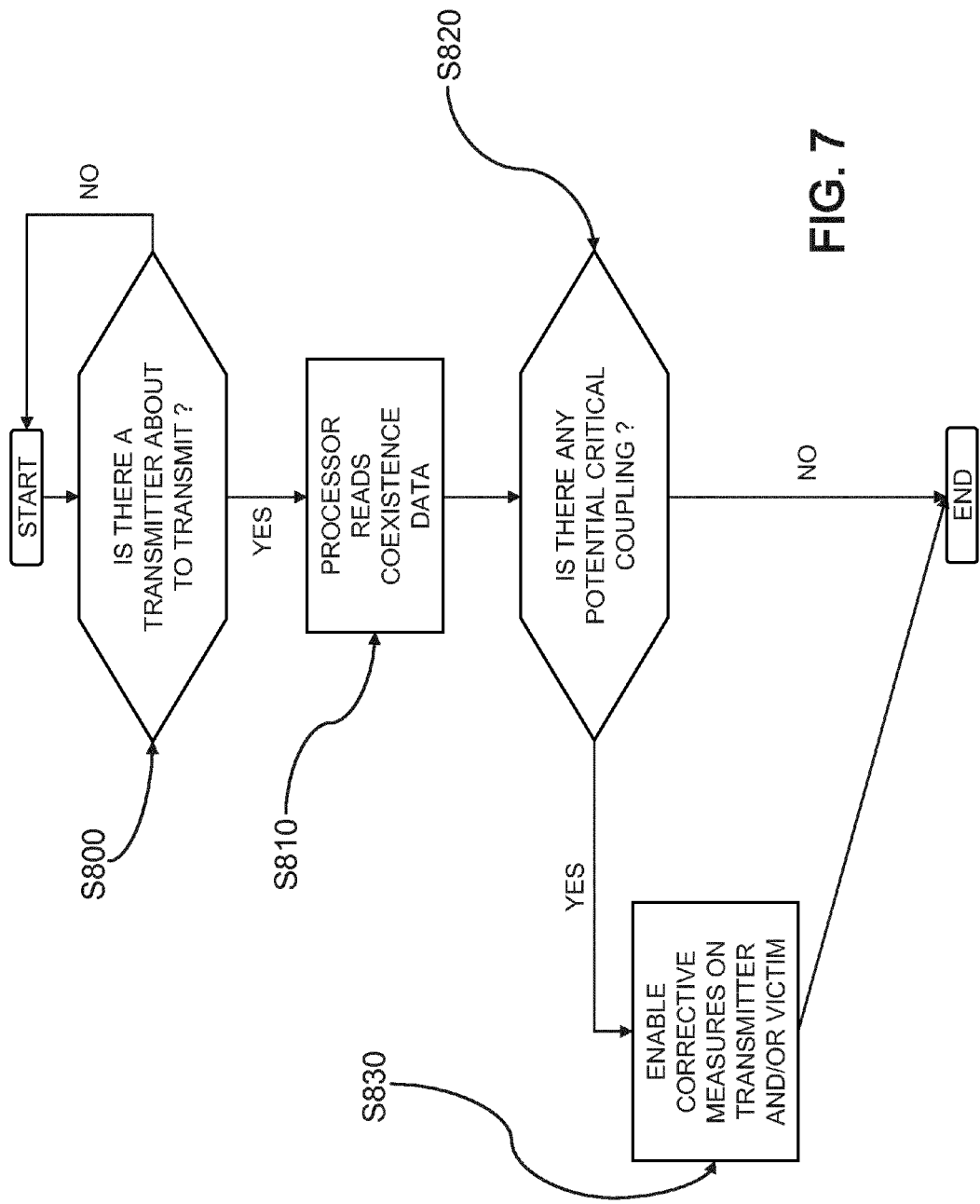

FIG. 7 is a flow diagram illustrating embodiments of the proposed method. Depending on the embodiment, additional steps may be added, others removed, and the ordering of the steps rearranged. Referring to FIG. 7 in step S800, a control is made on the wireless device on whether there is a transmitter about to transmit. If this is not the case, the iterative algorithm does not start. If this is the case, on the contrary, in step S810 the processor reads coexistence data to be aware of all the possible coupling in the wireless system. In step S820, a control is made to check whether potential critical coupling have been detected in the coexistence data. If this is not the case, the algorithm would stop. If it is the case, in step S830, corrective measures are implemented as described in the foregoing.

While the proposed solution has been illustrated and described in details in the drawings and foregoing description, it is to be understood that the above-described illustration and description are to be considered illustrative and exemplary only, the proposed solution being not restricted to the disclosed embodiments. For instance, it should be noted that the proposed solution is not limited to WiFi, Bluetooth, ZigBee, UWB, Wireless HDMI, GPS and 2G/3G/4G cellular systems. Other variations to the disclosed embodiments can be understood and effected by those skilled in the art in practicing the claimed proposed solution, from a study of the drawings, the disclosure and the appended claims. It is therefore intended that such variations be included within the scope of the Claims.

In the claims, the word "comprising" does not exclude other elements or steps, and the indefinite article "a" or "an" does not exclude a plurality. A single unit may fulfil the functions of several items recited in the claims. The mere fact that different features are recited in mutually different dependent claims does not indicate that a combination of these features cannot be advantageously used. Any reference signs in the claims should not be construed as limiting the scope of the proposed solution.

The invention claimed is:

1. A method of calibrating coexistence of a plurality of wirelessly communicating sub-systems within a wireless device wherein the plurality of wirelessly communicating sub-systems comprises a plurality of transmitters and a plurality of receivers which are interconnected through one or more interfaces, the method comprising:
    activating a single one of the transmitters while maintaining the other transmitters off by causing said transmitter to transmit a first signal with a known set of characteristics;
    measuring unwanted signal received at each of the plurality of receivers and originating from a coupling of said receivers with the activated transmitter;
    storing coupling data derived from each of the measured unwanted signals in relation with the set of signal characteristics of the first signal and/or a set of unwanted signal characteristics, whereby forming a calibration database usable for adjusting operation of one or more of the plurality of transmitters and/or receivers to manage the coexistence of the plurality of wirelessly communicating sub-systems during normal operation of the wireless device; and
    wherein the activating, measuring and storing are repeated for each of the plurality of transmitters.

2. The method of claim 1, wherein the plurality of sub-systems operates respective communication technology.

3. The method of claim 1, wherein the measuring of unwanted signal comprises measuring received signal strength indication (RSSI).

4. The method of claim 1, wherein the coupling data is equal to the difference between the unwanted signal and a noise floor for said receiver defined as the level of noise received when none of the plurality of transmitters is activated.

5. The method of claim 1, wherein the set of signal characteristics comprises at least one of signal power level, signal frequency and signal modulation scheme.

6. The method of claim 1 wherein the adjusting operation comprise performing at least one of:
    adjusting signal power level, signal frequency and/or signal modulation scheme of at least the transmitter;
    causing a receiver to drop the received data; and/or,
    causing a receiver to be deactivated.

7. An apparatus for calibrating coexistence of a plurality of wirelessly communicating sub-systems within a wireless device wherein the plurality of wirelessly communicating sub-systems comprises a plurality of transmitters and a plurality of receivers which are interconnected through one or more interfaces, the apparatus comprising:
- a unit configured for activating a single one of the transmitters while maintaining the other transmitters off by causing said transmitter to transmit a first signal with a known set of characteristics;
- a unit configured for measuring unwanted signal received at each of the plurality of receivers and originating from a coupling of said receivers with the activated transmitter;
- a unit configured for storing coupling data derived from each of the measured unwanted signals in relation with the set of signal characteristics of the first signal and/or a set of unwanted signal characteristics, whereby forming a calibration database usable by a unit configured for adjusting operation of one or more of the plurality of transmitters and/or receivers to manage the coexistence of the plurality of wirelessly communicating sub-systems during normal operation of the wireless device; and wherein the activating, measuring and storing are repeated for each of the plurality of transmitters.

8. The apparatus of claim 7, wherein the plurality of sub-systems operates respective communication technology.

9. The apparatus of claim 7, wherein the measuring of unwanted signal comprises measuring received signal strength indication.

10. The apparatus of claim 7, wherein the coupling data is equal to the difference between the unwanted signal and a noise floor for said receiver defined as the level of noise received when none of the plurality of transmitters is activated.

11. The apparatus of claim 7, wherein the set of signal characteristics comprises at least one of signal power level, signal frequency and signal modulation scheme.

12. The apparatus of claim 7, wherein the adjusting operation comprise performing at least one of:
- adjusting signal power level, signal frequency and/or signal modulation scheme of at least the transmitter;
- causing a receiver to drop the received data; and/or,
- causing a receiver to be deactivated.

13. A wireless device comprising an apparatus as claimed in claim 7.

* * * * *